United States Patent [19]

Morrell

[11] Patent Number: 4,745,602
[45] Date of Patent: May 17, 1988

[54] PRINTER ERROR AND CONTROL SYSTEM

[75] Inventor: Brian R. Morrell, Randolph, Mass.

[73] Assignee: Minolta Camera Company, Ltd., Osaka, Japan

[21] Appl. No.: 790,319

[22] Filed: Oct. 23, 1985

Related U.S. Application Data

[63] Continuation-in-part of Ser. No. 778,378, Sep. 20, 1985, abandoned.

[51] Int. Cl.$^4$ ............................................. G06F 11/00
[52] U.S. Cl. ........................................ 371/20; 371/29
[58] Field of Search ............................ 371/29, 20, 15; 364/200 MS File, 900 MS File; 400/74

[56] References Cited

U.S. PATENT DOCUMENTS

| | | | |
|---|---|---|---|
| 3,575,589 | 4/1971 | Neema | 371/29 X |
| 4,290,138 | 9/1981 | Bare | 371/29 |
| 4,452,136 | 6/1984 | Boynton | 364/900 X |

FOREIGN PATENT DOCUMENTS 154640 12/1980 Japan ...................................... 371/29

OTHER PUBLICATIONS

"Printer Device Driver Error Reporting" IBM TDB, vol. 28, No. 11, Apr. 1986, pp. 5071-5072.

Primary Examiner—Jerry Smith
Assistant Examiner—Robert W. Beausoliel
Attorney, Agent, or Firm—Weingarten, Schurgin, Gagnebin & Hayes

[57] ABSTRACT

A printer or plotter for providing printed representation of text and graphics, which further provides a specific error code signal returned to the host system. The error signals comprise fatal and nonfatal classes of system errors. The system of the data output device provides a large number of specific error conditions, to provide a specific error status indication to the system host. Upon occurrence of certain recoverable conditions for nonfatal errors, when recognized by the host system, the host computer may invoke a procedure to reset the data output device, and adjust its output data flow accordingly to provide a corrective measure in operation of the host computer with the data output device according to the present invention.

3 Claims, 5 Drawing Sheets

4,745,602

PRINTER ERROR AND CONTROL SYSTEM

FIELD OF THE INVENTION

The present invention relates to data output devices, and in particular to a computer printer, plotter, or similar output device having an error system providing error messages to a host system, which is a continuation-in-part of parent application Ser. No. 778,378 filed Sept. 20, 1985 and now abandoned.

BACKGROUND OF THE INVENTION

Data output devices used in conjunction with host computing systems, such as printers and plotters, were initially mechanically and electrically simple. The information was printed as soon as it was received, the speed of the signals was carefully limited to match the printing capacity of the output device. Over time, increased printing capacity was provided by improved mechanical systems and/or CRT display devices in conjunction with data buffers which would serve to store a rapid burst of signals from the host system while the printer printed at a slower rate. Current data output devices also restrict the host system output signals, presuming that the device accurately follows and displays the signal outputs in printed text or graphic forms. However, any errors from the data output device were typically ignored unless the system completely shut down, or were detected by operator intervention. As a result, noncatastrophic failures would frequently go by unnoticed and/or uncorrected unless attended to directly by the operator. Other erroneous conditions, such as the excessive speed of data output signals to the computer output device from the host, or improper coded instructions would not be detectable or discernable by the host computer without operator intervention.

SUMMARY OF THE INVENTION

The data output device according to the present invention provides two-way communication with the host system, wherein the data to be printed and the commands associated therewith are received from the host system by the printer, and in return, the data output device returns printer error messages to the host system when applicable. The data output device in the preferred embodiment according to the present invention includes a laser output printer (engine) having a bit-map structure wherein complex graphics are composed in a bit-map memory before they are printed by the laser printing engine. Necessarily, the structure is sufficiently complex to require separate printer engine and system controller processors therein. A result of the complex structure is the numerous forms of system errors which may arise, in addition to the normal operator and mechanical problems which would be significant to the entire system operation. The typical problems which are reported to the host system includes recoverable operator conditions, such as a paper jam in the sorter, severe or recoverable errors such as an incorrect order of plot coordinates, and fatal errors, such as a bad system memory. As a result, the system incorporating the data output device according to the present invention can accommodate a more sophisticated and intelligent driver program and is capable of improved productivity.

DESCRIPTION OF THE DRAWING

These and other features according to the present invention will be better understood by reading the following detailed description, taken together with the drawing, wherein.

DETAILED DESCRIPTION OF THE INVENTION

Figure 1:
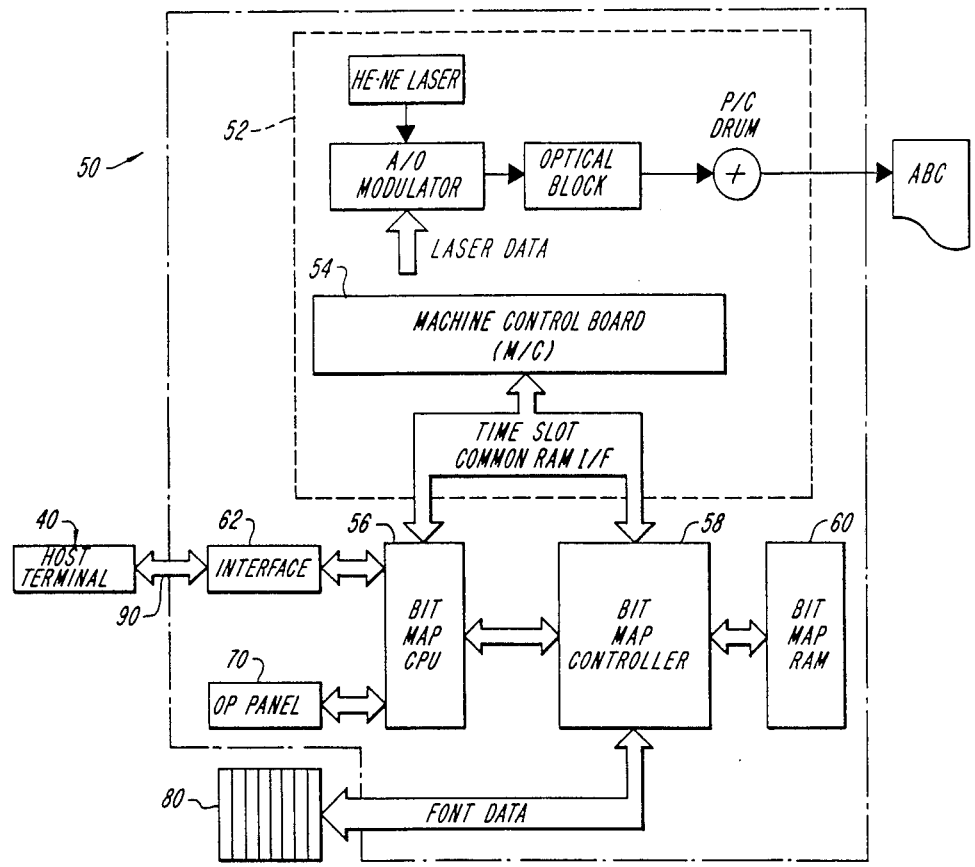
FIG. 1 is a block diagram of the data device hardware.

The data output device 50 according to the present invention is shown in FIG. 1 and comprises in preferred embodiment a laser printer. The printer receives the control and data signals from a host terminal 40, typically comprising a computer or computer system. The data output device 50 includes a laser printing engine 52 which comprises a machine structure and a machine control board 54 which supplies control and data information to the machine structure and controls the machine structure. The machine control board 54 shares a time slot with the bit-map CPU 56 as well as the bit-map controller 58, which also communicates with the bit-map memory 60, discussed below. The bit-map CPU receives the signals from the host terminal 40 through an interface 62 and is directed to provide the printed output according to the instructions provided to the machine on the operator control panel 70, discussed further below with regard to FIG. 4. In addition, the bit-map controller 58 receives program and font data through font cartridges 80, which are user-selectable and removable to allow user selection and entry of test and upgraded system software therethrough.

Figure 2:
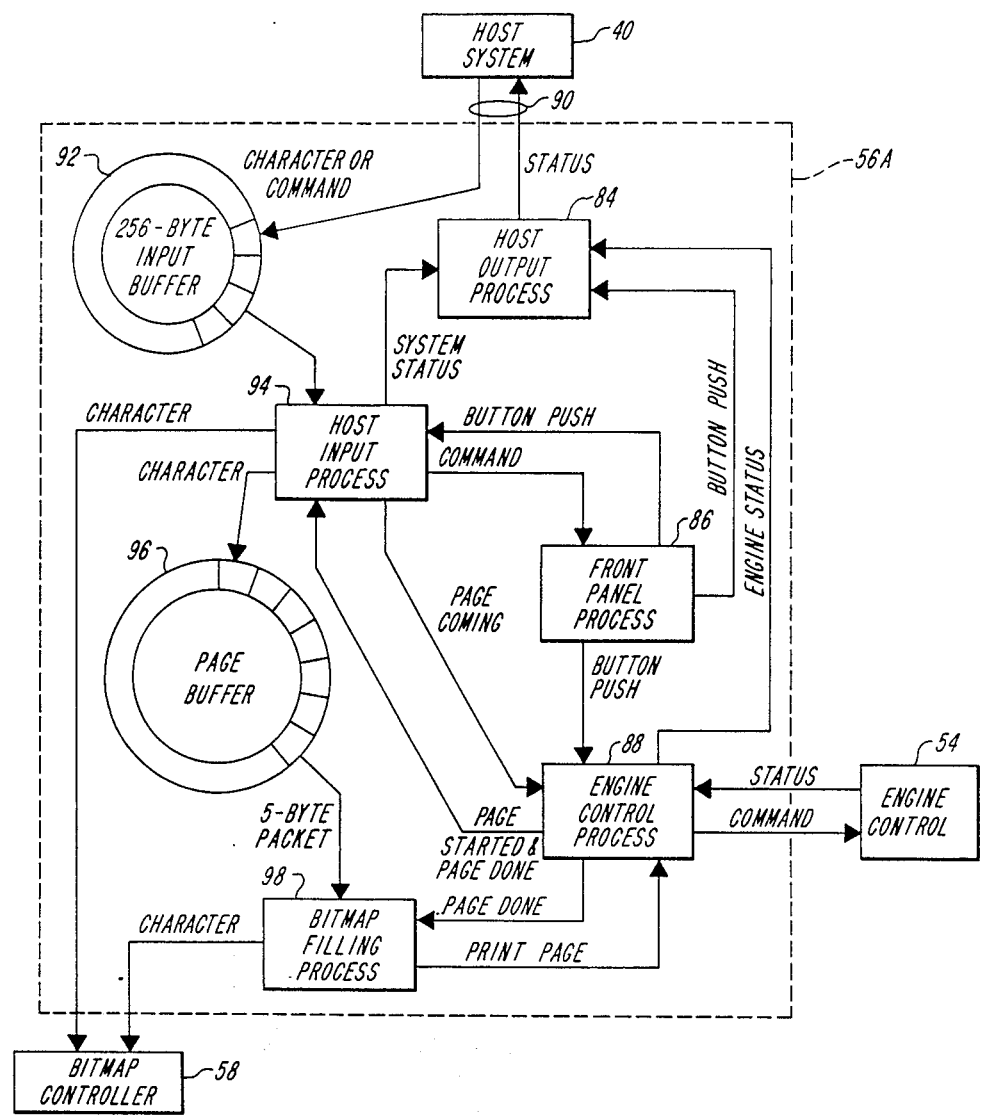
FIG. 2 is a state diagram of the signal flow in the data output device according to the present invention.

A state diagram 56A of FIG. 2 shows the processing of the bit-map CPU 56 which deals with signals to and from the host system 40 via a bidirectional communication channel 90, and also signals to the bit-map controller 58 and the engine controller 54. The signal from the host system 40, either a character or a command, is received by an input buffer 92 which temporarily stores the information before the host input process 94 provides the character and command processing. A page buffer 96 receives the character information from the host input process 94 and stores it until the bit-map filing process 98 is performed, providing a character output signal flow to the bit-map controller 58. Similarly, an engine control process 88 provides command signals to the engine controller 54, and reads status conditions therefrom. The engine control process 88 communicates with the host input process 94, as well as receiving control instructions from the front panel process 86, by which the operator defines the machine parameters. The front panel pushbutton signal, along with the engine status and the system status from the front panel, engine control and host input processes 88, 86, and 94, respectively, are received by a host output process 94 to provide the error status indication communicated to the host system 40 on the bidirectional channel 90.

Figure 3:
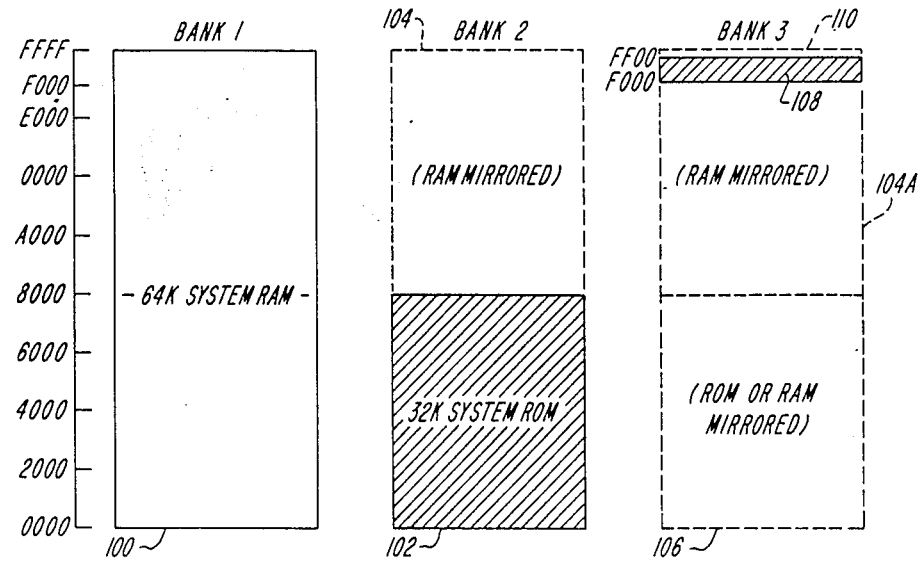
FIG. 3 shows a printer processor memory map.

The bit-map CPU 56, operable according to the flow state 56A, shown in FIG. 2, includes a memory area of entire 64K byte described generally in FIG. 3. FIG. 3 shows three different states of the memory area indicated as a bank 1, 2, and 3, which are adapted to correspond with different situations, respectively. Bank 1 shows the address scheme of the memory. In bank 2, the entire 64K system RAM area 100 is divided into a 32K system read-only memory (ROM) area 102 which is loaded down from the font cartridge for conducting the normal operation and a RAM area 104 which serves for the input buffer 92, the page buffer 96, and the like. The operating system further includes a third bank of memory which mirrors the entire lower 32K portion of ROM or RAM at 106 as well as most of the RAM area 104A in the top 32K portion thereof. However, a 4K loader portion 108 is reserved for the top location thereof, and becomes activated when loading the 32K system into the lower portion of the 64K system RAM 100 as the ROM operating system 102 is to be temporarily overriden, such as used in system error diagnostic procedures. Furthermore, the aforementioned common 256-byte RAM area 110 discussed with regard to FIG. 1 for the engine control communication is resident at the top of the 64K memory area. This portion of memory is shared by the engine control board 54 and the bit-map CPU 56 for communication therebetween. In operation, the 32K system ROM provides a jump to the 4K loader program 108 upon a power-up sequence. At that time, if hardware problems are detected, the present invention provides a corresponding error signal, explained below, to the host computer. An error regarding the hardware structure would typically be a fatal error, and the system operation would be inhibited. The printer process controller according to the present invention communicates with the front panel 70, illustrated in FIG. 4. Under an error condition, the fault light 122 lights up, or the corresponding error code is indicated in the two-digit indicator lights 124. If the error is a recoverable error (denoted on the front panel) can be corrected by operator intervention, or host computer reset signals, the operation of the front panel 70 reverts to normal operation.

When the data output device according to the present invention is initially powered, the power-up sequence invokes the top 4K loader, which includes some error handling processes. The top 4K loader then loads the system in the bottom 32K area of the system RAM 100, and removes the system memory area during normal operation. During a fatal error condition, the 4K loader at 108 is restored and diagnostic procedures are invoked to check the system mechanical hardware and programming system for errors. The 4K loader 108 then takes the front panel 70 to display the error codes 10-79 and passes a corresponding parameter to an error detection and communication subroutine in the system of the bit-map CPU 56. The signal passed to the bit-map CPU includes an 8-bit word, wherein the first 7 bits correspond to the system error condition, and the eighth or most significant bit corresponds to a flag to indicate a severe or fatal system error. Upon receipt of this error code, corresponding to the same indication on the indicators 124 of the front panel 70, the system according to the present invention then communicates to the host system 40 the error status of the present system. Moreover, the present invention may report all operator instructions which have been entered to the front panel to the host computer via the bidirectional channel 90.

Figure 5:
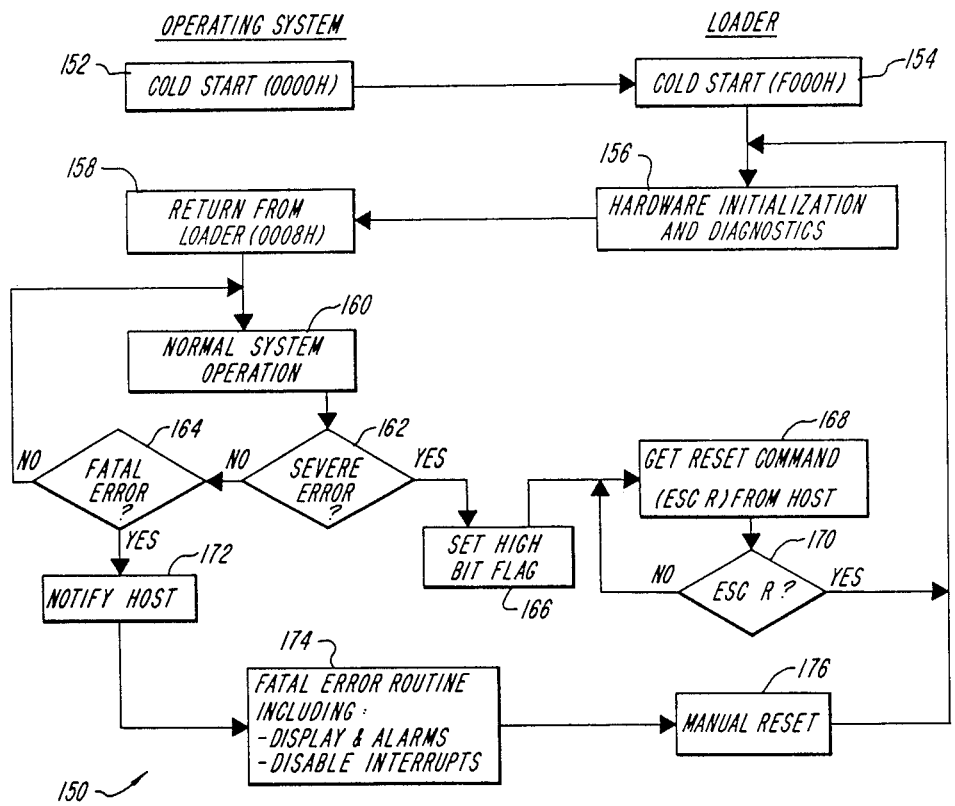
FIG. 5 is a flow chart of the error message systems.

The interrelationship between the operating system and the loader is shown in the flowchart 150 of FIG. 5. The operating system initiates the cold start sequence at 152, which transfers the cold start sequence to the loader at step 154. The hardware and diagnostics are initialized at step 156, whereupon the loader returns operation to the operating system at 158. Normal system operations begin and continue at 160, while maintaining a check for severe errors at 162 or fatal errors at 164. If a sever error is detected at 162, an eight-bit error code word, including a high bit signifying a severe error is provided at 166 and the loader gets a reset command from the host at steps 168 and 170. If a reset command, for instance "ESC R" (escape R), is received from the host 40, the loader restarts the hardware and diagnostic initialization step 156, and then returns the operating system to normal operation.

Figure 4:
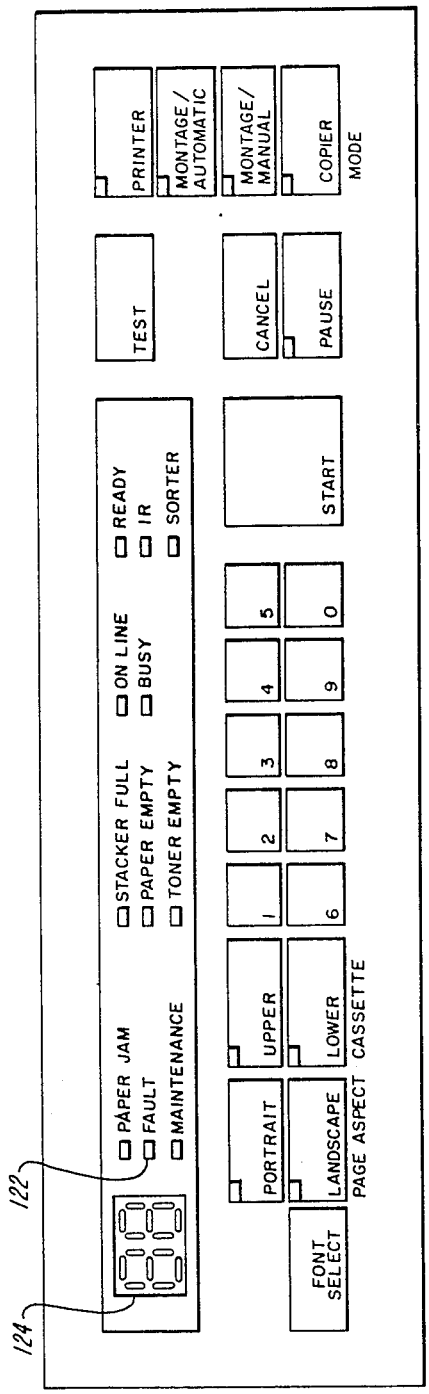
FIG. 4 is a plan view of the front panel as used for error signal display and operator control according to the present invention.

If a fatal errror is detected at 164, the operating system notifies the host at 172, and transfers operation to the loader, including a fatal error routine at 174 which displays the error code on the front panel shown in FIG. 4, including blinking and beeping alarms to notify the operator. Moreover, the fatal interrupt routine 174 disables all systems interrupts. Thereafter, the system may only be reset by manual operator intervention at step 176 before the hardware and diagnostics are reinitialized at step 156 to return the printer to normal system operation.

Figure 6:
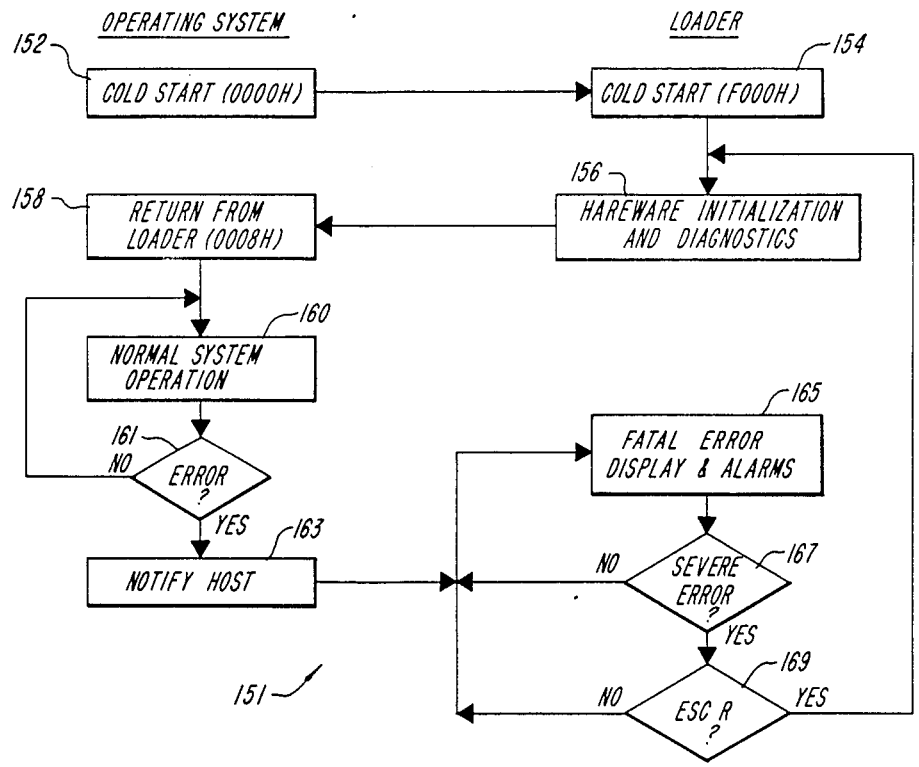
FIG. 6 is a flow chart of an alternate embodiment of the error message system.

The operation 151 of an alternate embodiment of the present invention is shown in FIG. 6. As in the previous embodiment of FIG. 5, discussed above, the operating system initiates a cold start sequence at step 152, which transfers the operation to the loader at step 154. The hardware and diagnostics are initialized at step 156, after which the loader returns operation of the operating system at step 158. The normal system operation begins at step 160. If no error is detected at step 161, the host system is notified at step 163. At the same time, if the detected error is a severe error, the most significant bit of an internal error word is set. The operating system transfers operation of the loader, where the fatal error display and alarms are invoked at step 165. If, at step 167, the detected error is determined to be a severe error (according to the most significant bit of the internal error work,) the system will loop through steps 165, 167, and 169 until an "ESC R" (escape R) character is received from the host and detected at step 169 to then reinitialize the hardware and diagnostics at step 156. Otherwise, if the error is not a severe error (i.e., fatal or recoverable error), the system will loop through step 167 until the system is manually reset, which restarts the system from the cold start step 152.

As mentioned above, the error conditions include the fatal error conditions and the severe error conditions. Also included are the recoverable operator conditions which most of which are indicated in the front panel two-digit indicator 124, and some are communicated to the host system 40.

Some errors comprise severe but not fatal errors which, in some instances, allow the system to reset the printer 50 by a command from the host to the bit-map CPU along the channel 90. The fatal errors require the system power to be turned off or otherwise manually reset.

Genrerally, the errors are categorized according to the error codes displayed on the 2-digit indicator 124.

The recoverable errors are also indicated by codes values E1 to E9. The error codes between 10 and 19 include errors arising from power-up tests, which are issued by the 4K loader and are all fatal. The error code values between 20 and 29 include mechanical problems detected by the mechanical control processor. Since this prevents printing, these error code values are fatal. The errors between 30 and 39 include transient or printer software faults. These error messages include errors which are communicated through the common 256-byte memory (at location between FF00 and FFFF) reserved for a dedicated interrupt to communicate with the engine processors includes the timing, software, and error code values 33, 30, 31, and 32. The host programming errors are in the error code values range of 40-49, and intial set-up or host baud rate errors are communicated by error code values 50-59. Software error messages include error code values 60-69, and do not normally occur in the field. Error code values 70-79 include errors arising from static discharge and other transient induced failures.

To maximize the usefulness of the sophisticated computer output device according to the present invention, the driving program (not shown) in the host terminal 40 must necessarily be intelligent enough to recognize the error codes listed above, and provide the corresponding response, such as an appropriate system reset.

In addition, changes and substitutions to the system according to the present invention made by one skilled in the art also within the scope of the present invention, which is not to be limited by the claims that follow.

What is claimed is:

1. For use with a host system having a bidirectional communication port, a data output device, comprising:
    printer means for providing an image according to a sequence of signals;
    a printer process controller for receiving signals from said host system and for providing signals to said printer means in response to said signals from said host system, and further providing error signals to said host upon occurrence of an error condition as detected by said printer process controller, said error signals indicating first kind of error and second kind of error which is more severe than the first kind of error and fatal to the operation of said printer means; and
    means for resetting said printer means and said printer process controller upon receipt of a reset command from said host system only in response to the first kind of error condition.

2. For use with a host system having a bidirectional communication port, a data output device, comprising:
    printer means for providing an image according to a sequence of signals;
    a printer process controller for receiving signals from said host system and for providing signals to said printer means in response to said signals from said host system, and further providing error signals to said host upon occurrence of an error condition as detected by said printer process controller, said error signals indicating first kind of error and second kind of error which is more severe than the first kind of error; and
    means for resetting said printer means and said printer process controller upon receipt of a reset command from said host system only in response to the first kind of error condition, wherein said printer process controller comprises:
    a computer operating system, including a memory space having an allocated area including:
    a bootstrap loader;
    a loadable operating system;
    a communication area for communication with said printer; and
    a RAM area, wherein
    at least one error message is provided by said bootstrap loader.

3. The data output device of claim 2, further comprising a display means, wherein
    said loadable operating system provides error signals to said display means for display of at least a portion of said error messages thereon.

* * * * *

UNITED STATES PATENT AND TRADEMARK OFFICE
CERTIFICATE OF CORRECTION

PATENT NO. : 4,745,602
DATED : May 17, 1988
INVENTOR(S) : Brian R. Morrell

It is certified that error appears in the above-identified patent and that said Letters Patent is hereby corrected as shown below:

Column 4, line 12, "sever" should read --severe--.

Column 4, line 67, "Genrerally," should read --Generally,--.

Column 5, lines 1-2, "codes val-
    ues E1 to E9. The error codes between"
  should read --codes E1 to E9. The error
    code values between--.

Column 5, line 7, "these error code values are fatal."
  should read --these errors are fatal.--.

Column 5, line 8, "The errors between" should read
  --The error code values between--.

Column 5, line 15, "values" should read --value--.

Column 5, line 30, "art also" should read --art are also--.

Column 5, line 31, "limited by" should read --limited except by--

Signed and Sealed this

Eighteenth Day of July, 1989

Attest:

DONALD J. QUIGG

*Attesting Officer*       *Commissioner of Patents and Trademarks*